Patented Aug. 14, 1951

2,564,640

UNITED STATES PATENT OFFICE 2,564,640

TREATMENT OF RUBBER

James D. D'Ianni, Akron, Ohio, assignor to Wingfoot Corporation, Akron, Ohio, a corporation of Delaware No Drawing. Application November 19, 1946, Serial No. 710,953

5 Claims. (Cl. 260—768)

This invention relates to rubber derivatives, to methods for their preparation and to the use thereof. More particularly, it relates to materials prepared by reacting rubber with a mustard oil in the presence of a condensation catalyst.

One object of the invention is to produce rubber derivatives which are useful for a wide variety of purposes. Another object of the invention is to provide methods for preparing these rubber derivatives. Another object of the invention is to provide a method for employing these rubber derivatives as adhesives and particularly to provide a method for securing the adhesion of rubber to cellulose, cellulose derivatives and other materials with the production of laminated products having outstanding physical characteristics. Other objects and advantages will appear as the description proceeds.

According to the invention, a mixture of rubber and a mustard oil is treated with a condensation catalyst to produce rubber derivatives which may be used for molding, coating and other purposes and are particularly useful as adhesives. The practice of the invention is illustrated by the following examples and description.

The reaction is illustrated by the following example, using allyl isothiocyanate, a preferred material.

Example

Five hundred grams of dead milled rubber and 100 grams of allyl isothiocyanate were milled in a small dough mixer until homogeneous and 25 ml. of a 40% solution of boron fluoride in ether were then added over a period of 2–3 minutes with continued mastication. The mixture was then heated to 35–40° C. and masticated for about one hour. The product was a dark brown, apparently homogeneous, plastic, sticky, rubberlike mass, easily sheeted out on a mill and readily soluble in benzol or toluene to give a thin cement.

Any other mustard oil may be used in place of the allyl isothiocyanate of the example. Further illustrative examples are methyl isothiocyanate, n-propyl isothiocyanate, isopropyl isothiocyanate, the butyl isothiocyanates, the heptyl isothiocyanates, the octyl isothiocyanates, phenyl isothiocyanate, the tolyl isothiocyanates, mesityl isothiocyanate, cyclohexyl isothiocyanate, $\alpha$- and $\beta$-decahydronaphthyl isothiocyanates. benzyl isothiocyanate, phenethyl isothiocyanate, $\alpha$- and $\beta$-naphthyl isothiocyanates, furfuryl isothiocyanate and the like. Those having unsaturation in a ring or chain are preferred.

Although boron fluoride is a preferred catalyst, other condensation catalysts may also be employed to promote the formation of the rubber derivatives. The condensation catalyst apparently produces some condensation or cyclization of the rubber molecules. In addition, the rubber reacts with the mustard oil to produce a complex product involving addition to or condensation with the added material. Thus, in general, any condensation catalyst which will cause condensation or cyclization of the rubber molecules may be used. The halides of the amphoteric metals are a preferred class. Further examples are sulfuric acid, phenol sulfonic acid, toluene sulfonic acid, various chlorsulfonic acids, aluminum chloride, ferric chloride, chromic chloride and others well known in the art.

The conditions of the reaction in preparing the rubber derivatives will vary with the choice of catalyst and starting materials. For example, boron fluoride causes a relatively rapid reaction while a mixture of zinc chloride and glacial acetic acid is slower. In general, the temperature will be in the range from 15 to 125° C. The time of reaction may be as short as 15 minutes or as long as 3 or 4 hours. The mustard oil may be used in widely varying proportions, 20–50% based on the rubber having been found to be satisfactory, quantities from 10–35% actually being retained by the rubber.

The rubber derivatives described are useful for many purposes but they are particularly advantageous in the preparation of adhesives and are eminently suitable for use in laminating rubber to cellulosic products, the latter type of lamination often giving considerable difficulty, especially when the cellulose is in regenerated form, as in rayon or cellophane. In using the derivatives in the lamination of rubber to cellulose, it is sometimes, though not always, desirable to employ them in conjunction with an organic diisocyanate, this procedure being especially advantageous when the cellulose is in regenerated form. Various diisocyanates, either aromatic or aliphatic, may be used. Illustrative examples are paraphenylene diisocyanate, meta-phenylene diisocyanate, the diphenylene diisocyanates, methylene di(p-phenylene isocyanate), ethylene di(oxytrimethylene isocyanate), and the diisocyanates of dipropyl ethers. Methylene di(p-phenylene isocyanate) gives outstanding results, may be prepared from readily available materials and constitutes a preferred example. If desired, the cellulose may be treated with the diisocyanate and thereafter treated with the rubber derivative and then laminated to rubber or, if desired, the diisocyanate may be added to the solution of the rubber derivative and the cellulose coated with the mixture. From the practical standpoint, the latter procedure is preferred and it has been found that particularly good results are obtained if a cement containing the rubber derivative and the diisocyanate is prepared and allowed to stand before use, for example, for about 24-48 hours. When the product of Example 1 was used in conjunction with hexamethylene diisocyanate, a rubber-to-rayon adhesion averaging 17.9 pounds was obtained, as compared with about 4 to 5 pounds for untreated cord.

The use of the adhesive compositions has been particularly described in connection with the lamination of regenerated cellulose to rubber since this is an especially difficult problem which emphasizes the merit of the invention but the adhesives are also excellent for securing natural cellulose, such as cotton cord, to rubber and for securing rubber to cellulose derivatives and to glass fibers and for other purposes.

This application is a continuation-in-part of my copending application Serial No. 407,604, now abandoned, filed August 20, 1941.

I claim:

1. As a new composition of matter, the product obtained by reacting rubber with an organic monoisothiocyanate in the presence of a condensation catalyst for rubber.

2. As a new composition of matter, the product obtained by reacting rubber with allyl isothiocyanate in the presence of a condensation catalyst for rubber.

3. A process which comprises reacting rubber with an organic monoisothiocyanate in the presence of a condensation catalyst for rubber.

4. As a new composition of matter, the product obtained by reacting 100 parts of rubber with 20-50 parts of an organic monoisothiocyanate in the presence of a condensation catalyst for rubber.

5. A process which comprises reacting 100 parts of rubber with 20-50 parts of an organic monoisothiocyanate in the presence of a condensation catalyst for rubber at a temperature between 15 and 125° C. for a time between 15 minutes and four hours.

JAMES D. D'IANNI.

REFERENCES CITED

The following references are of record in the file of this patent:

UNITED STATES PATENTS

| Number | Name | Date |
|---|---|---|
| 1,929,373 | Mark et al. | Oct. 3, 1933 |
| 2,227,777 | Farmer et al. | Jan. 7, 1941 |
| 2,311,656 | Griffith | Feb. 23, 1943 |
| 2,313,945 | Kellog et al. | Mar. 16, 1943 |
| 2,381,063 | Kung | Aug. 7, 1945 |
| 2,415,893 | Neal et al. | Feb. 18, 1947 |
| 2,417,424 | Latham | Mar. 18, 1947 |
| 2,417,792 | Verbanc | Mar. 18, 1947 |

Certificate of Correction

Patent No. 2,564,640 August 14, 1951

JAMES D. D'IANNI

It is hereby certified that error appears in the printed specification of the above numbered patent requiring correction as follows:

Column 1, line 35, for "mastification" read *mastication*; line 44, before "n-propyl" insert the words and comma *ethyl isothiocyanate,*;

and that the said Letters Patent should be read as corrected above, so that the same may conform to the record of the case in the Patent Office.

Signed and sealed this 18th day of December, A. D. 1951.

[SEAL]

THOMAS F. MURPHY,
*Assistant Commissioner of Patents.*